P. BROWN.
CAR BRAKE.
APPLICATION FILED SEPT. 27, 1913.
1,185,972.
Patented June 6, 1916.
2 SHEETS—SHEET 1.
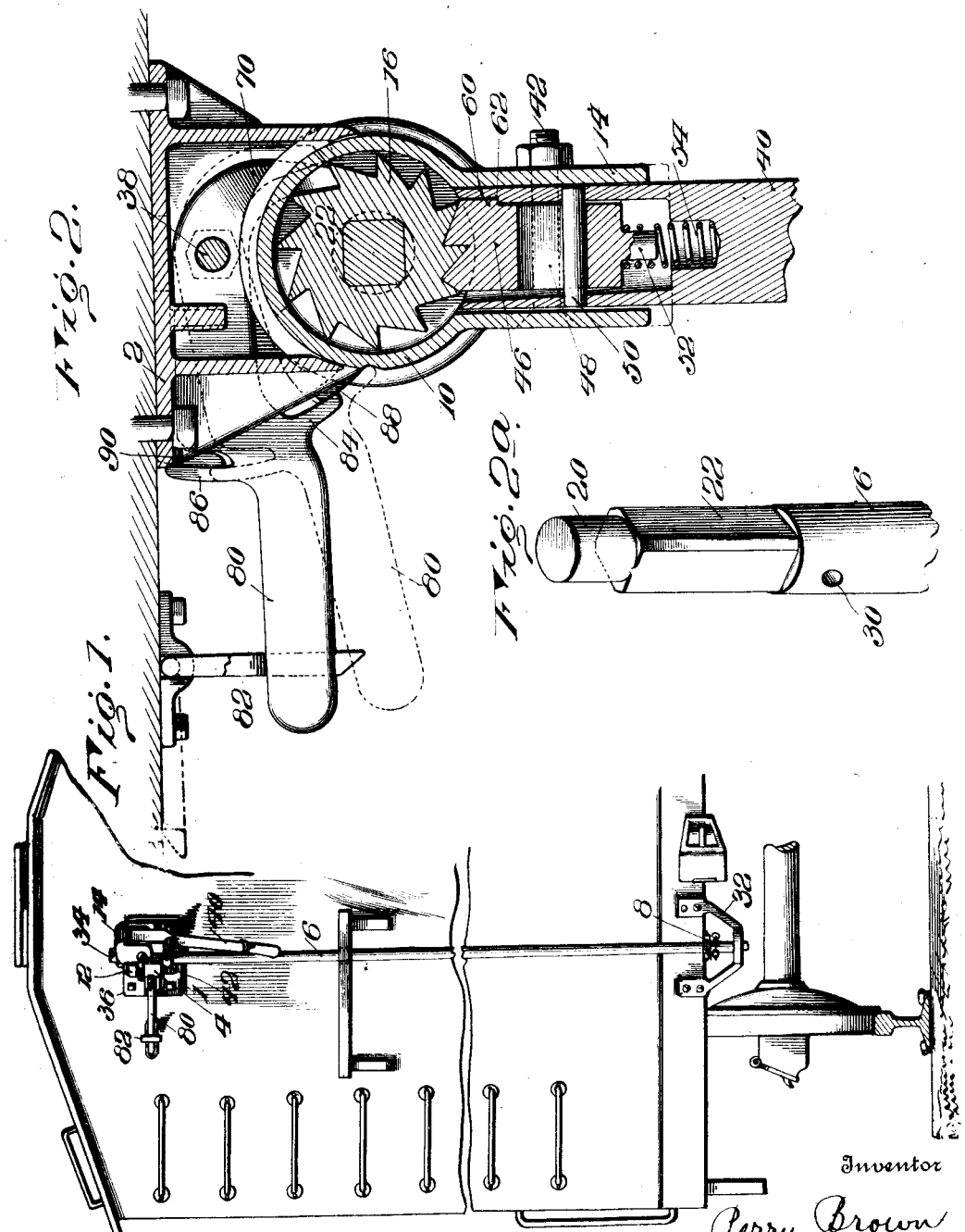
Witnesses
H. S. Smillie
T. I. Keenan.
Inventor
Perry Brown
By Robertson & Johnson
Attorneys

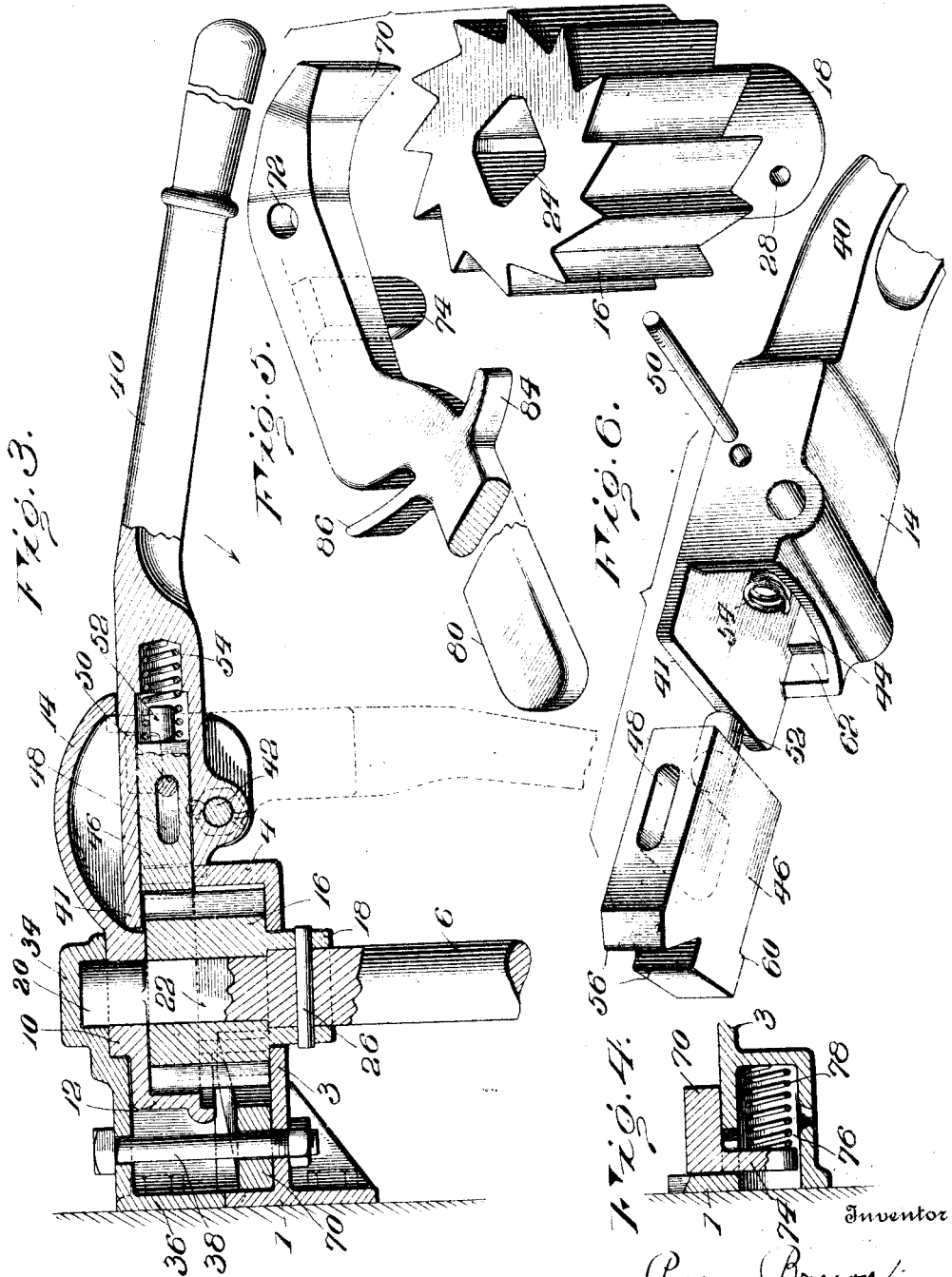

UNITED STATES PATENT OFFICE.

PERRY BROWN, OF CORAOPOLIS, PENNSYLVANIA.

CAR-BRAKE.

1,185,972.      Specification of Letters Patent.      Patented June 6, 1916.

Application filed September 27, 1913. Serial No. 792,173.

*To all whom it may concern:*

Be it known that I, PERRY BROWN, a citizen of the United States of America, and a resident of Coraopolis, in the county of Allegheny and State of Pennsylvania, have invented certain new and useful Improvements in Car-Brakes, of which the following is a specification.

This invention relates to brakes for railway cars and more particularly to hand operated brakes adapted to be secured to the end of freight cars, although the brake is capable of use on other cars.

The invention is designed particularly as an improvement on my prior Patents Nos. 1,037,120 and 1,037,121.

The invention consists in the combination and arrangement of parts hereinafter described and claimed.

In the drawings accompanying and forming part hereof: Figure 1 is a perspective view of part of the car having my invention applied thereto. Fig. 2 is a horizontal section. Fig. 2ᵃ is a perspective view of the end of the brake shaft. Fig. 3 is a vertical central section. Fig. 4 is a sectional detail. Fig. 5 is a perspective view of the ratchet wheel and its pawl detached. Fig. 6 is a perspective view of the parts of the operating handle or lever separated in order to better show their construction.

Referring now to the details of the drawings by numerals: 1 designates a frame, preferably a malleable casting, which is adapted to be secured to the end or any other portion of a car and has formed preferably integrally therewith, a bottom plate 3 having an annular portion 4, the plate 3 having an opening through which projects the brake shaft or staff 6 to which the ordinary brake chains 8 are connected as illustrated in Fig. 1. Located above the annular portion 4 is a member 10 having an annular portion 12 and a socket 14. The annular portions 4 and 12 of the members 1 and 10 form a housing for the ratchet wheel 16, the latter having a short sleeve 18 preferably formed integrally therewith and which projects through the opening in the bottom plate 3 of the member 1. The upper end of the brake shaft 6 is formed of the shape shown in Fig. 2ᵃ and has an upper cylindrical portion 20 under which is a squared portion 22. The squared portion 22 fits within a square opening 24 formed in the ratchet wheel 16, and the ratchet wheel is secured to the brake shaft by means of a pin 26 passing through openings 28 in the sleeve 18 and through an opening 30 in the brake shaft 6. This construction I find of importance for the reason that should the stirrup 32, shown at the bottom of Fig. 1, be broken off, or become displaced, the brake shaft 6 would be suspended from the member 1 owing to the fact that the ratchet wheel is carried by the bottom plate 3 and has the brake shaft 6 anchored to it by means of the pin 26 and sleeve 18.

The upper rounded end 20 of the brake shaft 6 projects through the aforesaid member 10 and projects into a cap 34 formed integrally with a second frame member 36 riveted or otherwise secured to the end of the car. The brake shaft therefore finds a bearing in the cap 34 and yet permits the member 10 to be moved upon the brake shaft as an axis, either with said shaft, or independently of the same. The members 1 and 36 may be securely bolted together by means of a bolt 38.

In order to move the member 10 with the brake shaft 6, or independently thereof, a brake handle or lever 40 is provided which projects within and is pivoted to the socket 14 hereinbefore referred to as projecting from the member 10. This socket 14 is so constructed as to form a housing for the active end of the brake handle or lever 40, and the active end of the lever is pivoted to the sides of the socket 14 by means of a pivotal pin 42. The construction is such that the handle or lever 40 normally falls by gravity and rests in the position shown in full lines in Fig. 1 and in dotted lines in Fig. 3, but an operator may move the handle or lever to the position shown in full lines in said Fig. 3. The active end of said lever 40 is provided with an opening 44 within which works a sliding dog 46, the dog having a slot 48 through which fits a pin 50 which limits the movement of the sliding dog 46. The rear end of the dog has a projection 52 which fits within and centers a spring 54, shown in Figs. 2, 3 and 6. In its preferable form, the dog is arranged with two teeth 56 and these teeth are in just the proper position, when the handle is moved from the inactive position shown in dotted lines in Fig. 3 to the active position shown in full lines in the same figure to engage with two teeth of the ratchet wheel 16 as shown in Fig. 2. One side of the sliding dog 46 is provided with a shoulder 60 which fits within a recess 62 formed on the inner wall of the opening 44. The purpose of this construction is to prevent the sliding dog from being shoved, in any way, to the rear, when in the position shown in Fig. 2. As soon, however, as the operator moves the handle of lever 40 to the right, as shown in Fig. 2, the sliding dog 46 has sufficient play within the opening in the end of the lever 40 to permit the shoulder 60 to be automatically moved out of the recess 62, when the dog will be permitted to move to the rear against the tension of the spring 54 and thus the teeth of the dog will slip over the teeth of the ratchet.

As in my aforesaid patents, I employ a pawl 70 to coact with the teeth of the ratchet wheel 16 and hold the same but this pawl is formed in a somewhat different manner from that shown in my aforesaid patents. The pawl is provided with an opening 72 through which passes the bolt 38 hereinbefore referred to as securing the members 1 and 36 together, and thus this bolt forms a pivot on which the pawl may swing. The pawl has a lug 74 projecting downward therefrom into a recess 76 formed in the bottom of the member 1, said recess containing a spring 78 which acts against said lug 74 to normally hold the pawl 70 in engagement with the teeth of the ratchet wheel 16. The rear end of the pawl 70 is formed into a handle 80 which extends outside of the housing formed between the members 1 and 36 so that an operator may readily engage this handle and move it to release the ratchet wheel whenever necessary. It is sometimes necessary to lock the pawl 70 in engagement with the teeth of the ratchet wheel 16. To permit this to be easily done, I provide a pivoted link 82 secured to the end of the car, which link may be swung around the handle 80 and hold the same in the position shown in full lines in Fig. 2. The handle has two projections 84 and 86, the first of which, 84, coacts with a projection 88 projecting from the side 4 of the frame 1 and the other projection 86 is adapted to move over a similar projection 90 projecting from the frame 1, as illustrated in Fig. 2. These projections are so formed that in whatever position the handle 80 is moved, the projections fit over each other so as to entirely close the opening through which the handle projects, and thus prevent the accumulation of ice and dirt.

It is believed the operation of my brake will be manifest to those using such appliances; yet it may be best to state that in operation the brakeman raises the handle or lever 40 from the position shown in full lines in Fig. 1 to the position shown in full lines in Fig. 3, when the sliding dog 46 engages the teeth of the ratchet wheel 16. The brakeman then swings the handle back and forth in a horizontal position, with the brake shaft as an axis. As the brake handle is moved to the left, as indicated in Fig. 2, the ratchet wheel will be rotated, thus rotating the brake shaft to wind the chains 8, the spring actuated pawl 72 permitting the ratchet wheel to be rotated. As soon as the brakeman has swung the handle 40 as far as he can, he moves the brake handle in the opposite direction to the right, as shown in Fig. 2. During this movement, the sliding dog 46 moves in and out to permit its teeth to slide over the teeth of the ratchet wheel, but during this movement the ratchet wheel is held by the pawl 72. This operation may be repeated until the brakes are applied to the proper degree, when the brakeman may release the handle and it will fall by gravity to the position shown in Fig. 1, the brake being held applied by the pawl 70. Should it be thought advisable to lock the brakes, the brakeman may swing the link 82 over the handle 80 when the pawl will be locked in position and can not be accidentally released. Whenever it is necessary to release the brakes, the brakeman merely has to move the handle 80 against the tension of the spring 78, when the pawl 70 will be moved out of engagement with the ratchet wheel 16.

I desire to call particular attention to the fact that the upper wall of the active end of the handle 40 projects considerably over the sliding dog 46, as seen at 41 in Fig. 3. This construction is for the purpose of permitting the end 41 to close against the outer end of the socket 14, as shown in dotted lines in Fig. 3, and thus not only closing the socket, but acting as a stop to prevent the lower end of the handle or lever 40 from swinging inward too far.

It will be obvious that changes may be made without departing from the spirit of my invention, the scope of which is set forth by the appended claims.

What I claim as my invention is:

1. In a brake, the combination of a supporting member, a brake shaft projecting therethrough, and a ratchet wheel carried by said supporting member and having a member projecting through the bottom thereof and secured to said brake shaft beneath said bottom.

2. In a brake, the combination of a supporting member, a brake shaft projecting therethrough, and a ratchet wheel carried by said supporting member and having a sleeve projecting through the bottom of said member, said sleeve being secured to said brake shaft beneath said bottom.

3. In a brake, the combination of a brake shaft, a ratchet wheel thereon, and a handle having a sliding dog therein, said dog and the handle having coinciding portions holding the dog in locking engagement with the teeth of said ratchet wheel.

4. In a brake, the combination of a brake shaft, a ratchet wheel thereon, and a handle having a sliding dog thereon, said dog having an offset and said handle having a recess, said offset fitting in said recess when the dog is engaging the teeth of said ratchet wheel.

5. In a brake, the combination of a brake shaft, a member rotatably secured thereto and having a socket, a handle or lever pivotally supported with respect to said socket and having a projecting member adapted to close the rear end of the socket and prevent the brake handle moving too far in one direction.

6. In a brake, the combination of a brake shaft, a ratchet wheel thereon, a housing for said ratchet wheel, a pawl entering said housing and coacting with said ratchet wheel and having a handle projecting through an opening and projections on said housing at the point where the handle enters, and projections on said handle coacting with the projections on the housing closing the opening.

7. In a brake, the combination of a brake shaft, a ratchet wheel thereon, a member supporting said ratchet wheel and having a recess, a spring in said recess, and a pawl coacting with said ratchet wheel and having a member projecting into said recess and coacting with said spring whereby the pawl is normally held in engagement with said ratchet wheel.

8. The combination with a brake staff, of a housing at the top thereof, a drop handle pivoted to said housing, a clutch member on said staff within said housing, and a second clutch member carried by said handle and movable longitudinally and transversely thereof into and out of driving engagement with the clutch member of said staff.

In testimony whereof I affix my signature in presence of two witnesses.

PERRY BROWN.

Witnesses:
JOHN L. FLETCHER,
J. J. SHRIEL.